United States Patent
Dischamp et al.

(10) Patent No.: US 8,881,974 B2
(45) Date of Patent: Nov. 11, 2014

(54) SECURE ELECTRONIC ENTITY FOR TIME CERTIFICATION

(75) Inventors: Paul Dischamp, Paris (FR); Christophe Giraud, Paris (FR)

(73) Assignee: Oberthur Technologies, Colombes (FR)

( * ) Notice: Subject to any disclaimer, the term of this patent is extended or adjusted under 35 U.S.C. 154(b) by 1769 days.

(21) Appl. No.: 10/540,220

(22) PCT Filed: Dec. 10, 2003

(86) PCT No.: PCT/FR03/03657
§ 371 (c)(1),
(2), (4) Date: Jan. 9, 2006

(87) PCT Pub. No.: WO2004/066195
PCT Pub. Date: Aug. 5, 2004

(65) Prior Publication Data
US 2006/0163369 A1    Jul. 27, 2006

(30) Foreign Application Priority Data

Dec. 20, 2002   (FR) ..................................... 02 16378

(51) Int. Cl.
| | |
|---|---|
| G06K 7/10 | (2006.01) |
| G06F 17/00 | (2006.01) |
| G06F 21/00 | (2013.01) |
| G06F 11/30 | (2006.01) |
| G01D 15/20 | (2006.01) |
| G06F 12/14 | (2006.01) |
| G06K 19/073 | (2006.01) |

(52) U.S. Cl.
CPC ................................... G06K 19/073 (2013.01)
USPC ........... 235/377; 235/375; 713/186; 713/189; 346/80

(58) Field of Classification Search
USPC ........ 713/189, 186; 340/572.1; 235/380, 377, 235/375; 346/80; 702/89
See application file for complete search history.

(56) References Cited

U.S. PATENT DOCUMENTS

| | | | | |
|---|---|---|---|---|
| 4,766,294 | A * | 8/1988 | Nara et al. ..................... | 235/380 |
| 4,808,802 | A * | 2/1989 | Kano ............................ | 235/380 |
| 5,072,103 | A * | 12/1991 | Nara ............................. | 235/492 |
| 5,180,902 | A * | 1/1993 | Schick et al. ................. | 235/380 |
| 5,721,781 | A * | 2/1998 | Deo et al. ........................ | 705/67 |
| 5,768,382 | A * | 6/1998 | Schneier et al. ............. | 380/251 |
| 5,796,834 | A * | 8/1998 | Whitney et al. ................ | 705/60 |
| 5,799,086 | A * | 8/1998 | Sudia ............................. | 705/76 |
| 6,320,822 | B1 * | 11/2001 | Okeya et al. ................... | 368/66 |
| 6,826,128 | B1 * | 11/2004 | Berstis et al. ................ | 368/121 |
| 6,915,353 | B2 * | 7/2005 | Burkes et al. ................ | 709/248 |

(Continued)

FOREIGN PATENT DOCUMENTS

| | | |
|---|---|---|
| EP | 0 257 648 | 3/1988 |
| EP | 1 160 736 | 12/2001 |
| FR | 2 764 977 | 12/1998 |
| WO | WO 01/54057 | 7/2001 |

*Primary Examiner* — Daniel Walsh
(74) *Attorney, Agent, or Firm* — Young & Thompson

(57) ABSTRACT

The invention concerns a secure electronic entity (11) containing a time measuring unit (18) and comprising a unit (21) for certifying an information concerning a date or a time interval, the certifying unit (21) receiving from the time measuring unit (18) data concerning the date or the time interval and producing certification data of the information concerning a date or a time interval addressed to and external entity. The invention is applicable in particular to microcircuit cards.

22 Claims, 2 Drawing Sheets

(56) References Cited

U.S. PATENT DOCUMENTS

| | | | |
|---|---|---|---|
| 6,915,423 B2 * | 7/2005 | Lim et al. | 713/158 |
| 7,036,018 B2 * | 4/2006 | Horvat et al. | 713/189 |
| 7,182,251 B2 * | 2/2007 | Tomoeda et al. | 235/375 |
| RE39,644 E * | 5/2007 | Alcorn et al. | 380/251 |
| 7,343,400 B2 * | 3/2008 | Demoto et al. | 709/219 |
| 7,431,211 B2 * | 10/2008 | Sureaud | 235/454 |
| 8,149,635 B2 * | 4/2012 | Lee | 365/189.16 |
| 8,756,427 B2 * | 6/2014 | Shah et al. | 713/178 |
| 2001/0037454 A1 * | 11/2001 | Botti et al. | 713/176 |
| 2002/0001100 A1 * | 1/2002 | Kawanabe | 358/1.15 |
| 2002/0035552 A1 * | 3/2002 | Tsubura | 705/412 |
| 2002/0047781 A1 * | 4/2002 | Fallah | 340/572.1 |
| 2002/0153424 A1 * | 10/2002 | Li | 235/492 |
| 2002/0175211 A1 * | 11/2002 | Dominquez et al. | 235/492 |
| 2003/0005310 A1 * | 1/2003 | Shinzaki | 713/186 |
| 2003/0028691 A1 * | 2/2003 | Burkes et al. | 710/15 |
| 2003/0075609 A1 * | 4/2003 | Kim | 235/492 |
| 2003/0120615 A1 * | 6/2003 | Kuo | 705/78 |
| 2003/0177347 A1 * | 9/2003 | Schneier et al. | 713/151 |
| 2004/0003255 A1 * | 1/2004 | Apvrille et al. | 713/178 |
| 2004/0049684 A1 * | 3/2004 | Nomura et al. | 713/182 |
| 2004/0150468 A1 * | 8/2004 | Shimizu et al. | 327/566 |
| 2004/0172531 A1 * | 9/2004 | Little et al. | 713/155 |
| 2004/0203852 A1 * | 10/2004 | Janakiraman | 455/456.1 |
| 2004/0255119 A1 * | 12/2004 | Ukeda et al. | 713/169 |
| 2005/0021974 A1 * | 1/2005 | Anderson | 713/178 |
| 2005/0122841 A1 * | 6/2005 | Yanase | 368/10 |
| 2005/0135411 A1 * | 6/2005 | Sureaud | 370/463 |
| 2005/0185515 A1 * | 8/2005 | Berstis et al. | 368/204 |
| 2005/0187022 A1 * | 8/2005 | Walker et al. | 463/42 |
| 2005/0274797 A1 * | 12/2005 | Mollett et al. | 235/382 |
| 2006/0069939 A1 * | 3/2006 | Fredriksson et al. | 713/400 |
| 2006/0129849 A1 * | 6/2006 | Abgrall et al. | 713/300 |
| 2006/0135252 A1 * | 6/2006 | Amaitis et al. | 463/25 |
| 2006/0163369 A1 * | 7/2006 | Dischamp et al. | 235/492 |
| 2006/0192020 A1 * | 8/2006 | Tomoeda et al. | 235/492 |
| 2007/0123243 A1 * | 5/2007 | Suito | 455/419 |
| 2007/0201721 A1 * | 8/2007 | Malone et al. | 382/100 |
| 2007/0201723 A1 * | 8/2007 | Ito et al. | 382/100 |
| 2007/0266256 A1 * | 11/2007 | Shah et al. | 713/178 |
| 2008/0082852 A1 * | 4/2008 | Denpo | 713/340 |
| 2009/0133116 A1 * | 5/2009 | Waisbard et al. | 726/17 |
| 2009/0144076 A1 * | 6/2009 | Berstis | 705/1 |
| 2009/0265776 A1 * | 10/2009 | Baentsch et al. | 726/9 |
| 2012/0270496 A1 * | 10/2012 | Kuenzi et al. | 455/41.1 |

\* cited by examiner

SECURE ELECTRONIC ENTITY FOR TIME CERTIFICATION

The invention relates to a secure electronic entity for time certification. In particular, for this purpose, time is measured in the secure electronic entity.

Here the concept of management of time "in" the electronic entity is to be understood in the sense that such management is independent of any external system for measuring time, for example a clock signal generator or any other means of measuring time external to the electronic entity.

These specific features render the electronic entity of the present invention relatively inviolable.

The invention may be applied to other secure electronic entities, for example a secure microcircuit card.

For example, the secure electronic entity may be a secure microcircuit card such as a bank card, an access control card, an identity card, a subscriber identification module (SIM) card or a secure memory card (such as a Panasonic SD (Secure Digital) card) or a secure Personal Computer Memory Card International Architecture (PCMCIA) card (for example an IBM 4758 card).

Many applications need to be sure that a user effects an action in a given time period or before a limit date.

For example, for remote electronic payment of taxes, the taxable person must log onto the server of the Ministry of Finance before the limit date for payment of the tax and make the payment on-line before that date. The server itself checks that the payment has been made before the deadline.

This approach may become problematic if many users tend to carry out actions at the same time, typically just before the limit date or towards the end of the authorized period. The server or the communication channels may then become saturated unless communication infrastructures with a capacity greater than that otherwise required are provided between users and the server to absorb the resulting traffic peaks, which is costly.

Using the time indicated by the computer used by the taxable person to log onto the Ministry of Finance server could be envisaged. However, the time specified by that computer could easily be falsified.

An object of the present invention is to remove these drawbacks by substituting, in the above example, for the time supplied by the computer the time supplied and/or certified by a secure electronic entity. To this end, the present invention integrates the measurement of time into the electronic entity.

With this aim in view, the invention proposes a secure electronic entity noteworthy in that it contains means for measuring time and in that it comprises a unit for certifying an item of data relating to a date or a duration, the certification unit receiving from the time measuring unit information on the date or the duration and producing data certifying said item of data relative to a date or a duration intended for an external entity.

The external entity is typically that in which an application is executed using the secure electronic entity for the purposes of date or duration certification. The application may take the form of an executable computer program or an electronic circuit.

Accordingly, the date is calculated in a secure manner, since, in the secure electronic entity, fraudulent attempts to falsify the date are prevented.

Advantageously, the certification unit is adapted to supply a certified date or duration, or to certify the authenticity of a date or duration received from the outside, or to certify that an action has been effected in a given time period or before a limit date.

According to one particular feature, the secure electronic entity further includes a synchronization unit.

This means that a reference date may be defined that is common to the secure electronic entity and the application using the date or the duration that is to be certified or the action whose date is to be verified.

According to one particular feature, the certification unit uses authentication means, such as encryption means or an authentication code.

This means that the source and the integrity of certification data required by the application from the secure electronic entity can be guaranteed.

The time measuring unit is advantageously adapted to supply a measurement of time even when said electronic entity is not supplied with power by an external power supply.

The time measuring unit is advantageously adapted to supply a measurement of time when the electronic entity is not supplied with electrical power.

The time measuring unit is advantageously adapted to supply a time measurement independently of any external clock signal.

In this sense, the time measuring unit is autonomous, both from the point of view of the measurement of time and from the point of view of electrical power supply.

Alternatively, a battery and/or a clock may be provided in the electronic entity, of course.

The time measurement unit may include means for comparing two dates, a date generally being an expression of the current time and the two dates being understood here as two times defined relative to the same time reference.

In one preferred embodiment of the present invention, the secure electronic entity includes at least one subsystem comprising a capacitive component having a leak across its dielectric space, means for coupling said capacitive component to an electrical power supply for it to be charged by said electrical power supply, and means for measuring the residual charge in the capacitive component, said residual charge being at least in part representative of the time that has elapsed since the capacitive component was decoupled from the electrical power supply.

In this case, the capacitive component of the subsystem cited above can be charged only when the secure electronic entity is coupled to the electrical power supply. The latter may be external to the secure electronic entity, but this is not essential: the electronic entity may instead be supplied with power by a battery on or in it.

The electronic entity may include switching means for decoupling the capacitive component from the electrical power supply, this event initializing the measurement of time.

More generally, the measurement of time, i.e. the variation of the charge on the capacitive component, commences as soon as, after being charged, the component is electrically isolated from any other circuit and can be discharged only across its own dielectric space.

However, even if the measured residual charge is physically linked to the time that has elapsed between isolating the capacitive component and a given measurement of its residual charge, a measured time interval may be determined between two measurements, the first measurement determining a reference residual charge, as it were. The means for measuring the residual charge on the capacitive component are used when it is required to determine an elapsed time.

Means for measuring the residual charge may be included in the time measuring unit referred to above.

In the preferred embodiment, the means for measuring the residual charge comprise a field-effect transistor whose gate is connected to one terminal of the capacitive component, i.e. to one "plate" of a capacitor.

A capacitor of this kind may be implemented in the MOS technology, in which case its dielectric space may consist of silicon oxide. It is then advantageous for the field-effect transistor also to be implemented in the MOS technology. The gate of the field-effect transistor and the "plate" of the MOS capacitive component are connected together and constitute a kind of floating gate that may be connected to a component for injecting charge carriers.

There need not be any electrical connection proper with the external environment. The connection of the floating gate may be replaced by an electrically insulated control gate that charges the floating gate, for example using the tunnel effect or "hot carriers", and enables charge carriers to travel toward the floating gate that is common to the field-effect transistor and the capacitive component. This technique is well known to EPROM and EEPROM fabricators.

The field-effect transistor and the capacitive component may constitute a unit integrated into a microcircuit included in the secure electronic entity or forming part of another microcircuit housed in another secure electronic entity, such as a server.

At certain times, periodic or not, when the secure electronic entity is coupled to an external electrical power supply, the capacitive component is charged to a predetermined value that is either known or measured and stored, and the means for measuring the residual charge are connected to a terminal of the capacitive component.

The means for measuring the residual charge, in particular the field-effect transistor, is then no longer supplied with power, but its gate connected to the terminal of the capacitive component is at a voltage corresponding to the charge on the latter component.

The capacitive component is discharged slowly across its own dielectric space, with the result that the voltage applied to the gate of the field-effect transistor is progressively reduced. If an electrical voltage is applied again between the drain and the source of the field-effect transistor, an electrical current is generated from the drain to the source (or in the opposite direction, as appropriate) and may be collected and analyzed.

The value of the measured electrical current depends on the technological parameters of the field-effect transistor, the potential difference between the drain and the source, and the voltage between the gate and the substrate. The current therefore depends on the charge carriers that have accumulated in the floating gate common to the field-effect transistor and the capacitive component. Consequently, that drain current is also representative of the time that has elapsed between a reference date and the current date.

The leakage current of a capacitor of the above kind depends on the thickness of its dielectric space, of course, but also on other technological parameters, such as the lengths and areas of contact of the elements of the capacitive component. It is also necessary to take account of the three-dimensional architecture of the contacts of these elements, which may induce phenomena modifying the parameters of the leakage current (for example, modification of the so-called tunnel capacitance). The type and quantity of dopants and defects may be modulated to modify the characteristics of the leakage current.

Temperature variations, to be more precise the average of the heat energy input to the secure electronic entity, also have an influence. In fact, any intrinsic parameter of the MOS technology may be used to modulate the time measuring process.

The thickness of the insulative layer of the field-effect transistor is advantageously significantly greater (for example around three times greater) than the thickness of the insulative layer of the capacitive component.

The thickness of the insulative layer of the capacitive component is advantageously from 4 to 10 nanometers.

To obtain information that is representative substantially only of time, in a different embodiment at least two subsystems of the kind defined hereinabove may be used "in parallel". The two temperature-sensitive capacitive components are designed with different leakages, all other things being equal, in other words their dielectric spaces (thickness of the silicon oxide layer) have different thicknesses.

To this end, in one advantageous embodiment of the invention, the electronic entity defined above is noteworthy in that it comprises at least two subsystems each comprising a capacitive component having a leak across its dielectric space, means for coupling said capacitive component to an electrical power supply for it to be charged by said electrical power supply, and means for measuring the residual charge in the capacitive component, said residual charge being at least in part representative of the time that has elapsed since the capacitive component was decoupled from the electrical power supply, said subsystems comprising capacitive components having different leaks across their respective dielectric spaces, and in that said secure electronic entity further includes means for processing measurements of the respective residual charges in said capacitive components to extract from said measurements information substantially independent of heat input to said secure electronic entity during the elapsed time.

For example, the processing means may include a table of stored time values, this table being addressed by these respective measurements. In other words, each pair of measurements designates a stored time value independent of temperature and temperature variations during the measured period. The electronic entity advantageously includes a memory associated with a microprocessor, and a portion of that memory may be used to store the table of values.

Alternatively, the processing means may include software for calculating a predetermined function for calculating time information as a function of said two measurements substantially independently of the heat input.

In one particular embodiment, the secure electronic entity is portable. Thus all the practical advantages of portability may be obtained, for example the ability to carry time certification means in a pocket or wallet without needing to connect to a server.

The invention is particularly adapted to be applied to microcircuit cards. The secure electronic entity may be a microcircuit card such as a bank card, an access control card, an identity card, a SIM card or a memory card (such as a Panasonic SD card), or may include a microcircuit card, or may be of some other type, for example a PCMCIA card (such as an IBM 4758 card).

The invention is also noteworthy for its level of integration.

Other aspects and advantages of the invention will become apparent on reading the following detailed description of particular embodiments, given by way of nonlimiting example. The description refers to the accompanying drawings, in which.

Figure 1:
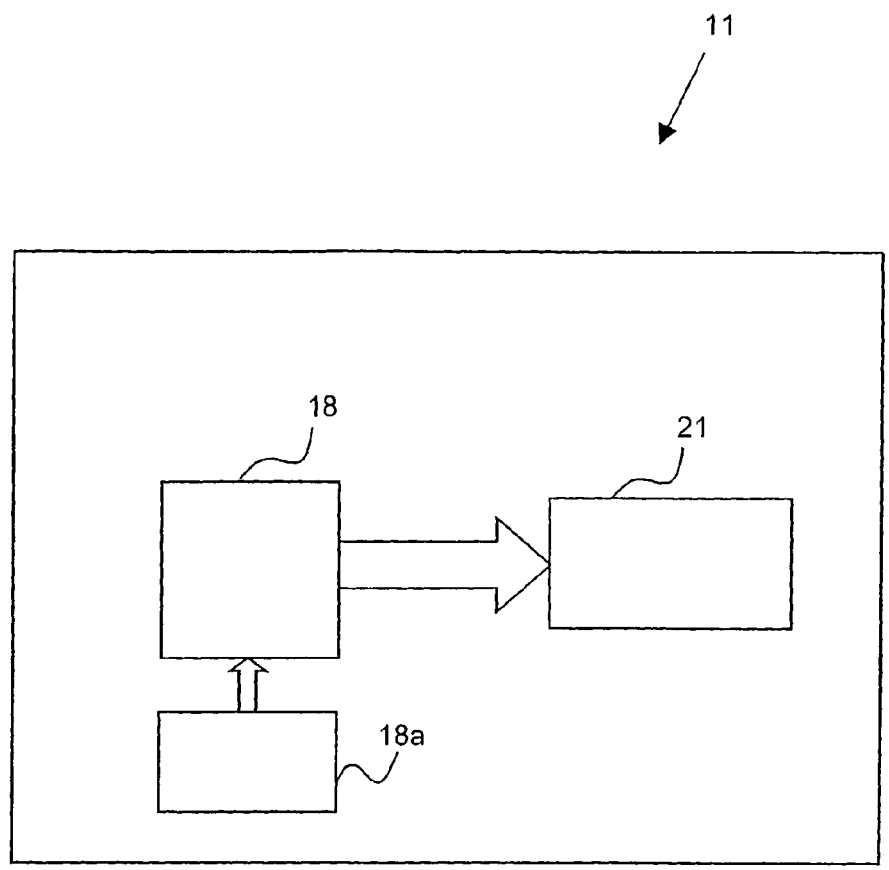
FIG. 1 is a block diagram of one particular embodiment of a secure electronic entity according to the present invention.

As shown in FIG. 1, one particular embodiment of a secure electronic entity 11 according to the present invention contains a time measuring unit 18.

The time measuring unit 18 or cell is independent of any external time measuring system, for example a clock signal generator or any other time measuring means external to the card.

The secure electronic entity 11 further includes a certification unit 21 that receives from the time measuring unit 18 information on elapsed time (the date or a duration).

According to the present invention, the certification unit 21 is adapted to supply a certified date or duration or to certify the authenticity of a date or duration received from the outside, or to certify that an action has been effected within a given time period or before a limit date.

The secure electronic entity 11 preferably includes a synchronization unit 18a, i.e. means for setting the time of the time measuring unit 18. This synchronization can be effected once at the beginning of the service life of the electronic entity, at a given time, or at various times.

The synchronization unit 18a may consist of means for assigning an offset value in a register, this offset value being thereafter added to the measured elapsed time since the charging of the time measuring unit 18 to obtain a current date.

The synchronization unit 18a can also read the time measuring cell (one particular embodiment of which is described in more detail hereinafter) during discharge and copy the initial value read or the associated date into a register, this initial value being thereafter subtracted from the measured elapsed time since the charging of the time measuring unit 18 to obtain a current date. This synchronization may be effected by means of a secure connection to a server or a terminal.

Alternatively, the synchronization unit 18a may also reset the date, for example by recharging the time measuring cell.

The synchronization unit 18a may further include means adapted to verify the unique nature of messages exchanged with the application, to prevent a message already received and copied fraudulently from being acted on in an unauthorized manner for a second time. This may typically be a message counter, a number being inserted into each message sent to the application and incremented each time a message is sent.

The secure electronic entity 11 may collaborate with the application to certify that a user effects an action in a given time period or before a limit date, for example at the request of the application using the secure electronic entity, which is located in an associated terminal, for example.

Accordingly, at the request of the application, the secure electronic entity 11 may:

supply a certified date or duration: the date sent back by the electronic entity is typically accompanied by a date authentication code (obtained by a technique known to the person skilled in the art, for example using a hashing function such as the SHA-1 or MD-5 function and a signature algorithm such as the RSA algorithm). The date and the authentication code are returned in encrypted form to guarantee secure communication, validate a date or duration given by the application: typically, after verifying the likelihood of the date or duration given by the application using the data received from the time measuring unit 18, the secure electronic entity 11 sends back an authentication code for the date received (obtained by a technique known to the person skilled in the art, for example using a hashing function such as the SHA-1 or MD-5 function and a signature algorithm such as the RSA algorithm), certify that an action has been carried out within a given time period or before a limit date: typically, the electronic entity sends back, possibly later, an authentication code for the date and data representative of the action (this code being obtained by a technique known to the person skilled in the art, using for example a hashing function such as the SHA-1 or MD-5 function and a signature algorithm such as the RSA algorithm). The data representative of the action and the authentication code are sent back in encrypted form to guarantee secure communication. For example, the electronic entity receives the data representative of the action directly from the application. In the particular embodiment in which the electronic entity is a microcircuit card, this representative data can be sent by the application and communicated to the card in the form of APDU commands. Alternatively, the electronic entity can recognize the action itself and calculate the data representative of that action.

Three applications of the present invention are described next by way of non-limiting example.

In the field of horseracing, consider a gambler who uses his mobile telephone at the beginning of the day to log onto the server of a racetrack. The SIM card associated with the mobile telephone receives in encrypted form a reference time and an authentication code for that reference time enabling the card to verify that the reference time is supplied by the racetrack server. The SIM card decrypts the time and associates it with the state of charge of the time measuring cell. The time and the charge are written into a file in EEPROM. Thus the SIM card and the racetrack server are synchronized. The gambler also tells the server the maximum amount that he wishes to bet (which amount will be debited from the account of the gambler if he does not log onto the network again in the days to come), and this amount is also written into the file in EEPROM.

Later in the day, the gambler places a bet by means of his mobile telephone, indicating the number of the race, the number of the horse and the amount that he wishes to bet. The SIM card then subtracts the amount of the bet from the amount written in the file in EEPROM. The SIM card refuses to place a bet as soon as the gambler's remaining credit becomes negative or zero. The SIM card also stores the data of the bet, for example a finishing order of the horses predicted by the gambler.

The SIM card then determines the time of the bet by comparing the current charge of the cell with the reference charge and the time written in the file in EEPROM.

This time, and the data of the bet, are encrypted and sent to the racetrack server by the SIM card, possibly after the limit time for betting on the race concerned, i.e. after the closing of bets. The SIM card also sends an authentication code for the time and the data of the bet. For security reasons, the authentication code is also sent in encrypted form.

The server receives this information and decrypts the data of the bet and the time at which the bet was placed. The server also verifies the authentication code received in order to be sure that this information was sent by the card, and not fraudulently. If the decrypted time indicates that the bet was placed before the closing of bets for the race concerned, the server validates the bet; otherwise it rejects it.

Accordingly, by virtue of the present invention, the gambler is not obliged to be physically present at the racetrack and/or to be connected to the server during the bet. For example, at the time of the bet, the telephone of the gambler may be in a region that is not covered by the mobile telephone network, or the server may be saturated. This does not prevent the gambler from validating his bet, because the SIM card will retain in EEPROM the information relating to the bet and, as soon as the telephone is again within the coverage of the network, or as soon as the server is available again, the SIM card will send the server the data relating to the bet.

In the field of voting by mobile telephone, for example in the context of certain television broadcasts, at a given time, a voter receives on his telephone a message telling him that he can vote, up to a certain limit date. The date and the current time are also transmitted with this message in encrypted form. The SIM card of the mobile telephone receives the message and decrypts the date. It then associates the charge in the cell with that date and writes these two items of data in a file in EEPROM. This achieves synchronization with the entity that provided the message.

At the moment of voting, the SIM card associates the current charge in the time measuring cell with a date as a function of the charge and the reference date contained in the file in EEPROM. That date, the choice of the voter, together with an authentication code of that date and that choice, are encrypted and then sent to the server.

On receiving them, the server decrypts the date and the choice of the voter, verifies the authentication code, and then accepts or refuses the vote according to the value of the date.

As in the preceding example, the vote may be effected without the telephone of the voter being immediately connected to the server, stored and then transmitted to the server a few days later.

In the field of time-limited software, at the start of use of the software a microcircuit card associated with the computer on which the software is run recharges the time measuring cell.

Thereafter, at any time during the use of the software, the card can read the current charge in the time measuring cell to obtain the current time of use of the software. For example, at the request of the software, the card sends this time to the software accompanied by an authentication code, with everything in encrypted form. The software decrypts the time received and verifies the authentication code received in order to be sure that the data was supplied by the card. If the time of use is less than the authorized time then the software continues to function normally; otherwise, the software is no longer able to function.

The software can also request the card to validate the date supplied by the terminal on which the software is run. For example, the card can verify that the date supplied by the terminal is that measured by the card to within ±24 hours if the license to use the software is granted for a period of one year, for example. Thus the microcircuit card has no need to measure time with great accuracy.

Note that there are many variants of the use of the time measuring cell: a cell charged at the beginning of the life of the card may be used, or a cell that is recharged at the time of synchronization (for example, at the time of registering with the racetrack server in the horseracing example, on reception of the message indicating the possibility of voting in the electronic voting example, or at the start of use of the software in the time-limited software example). In the time-limited software example, if there is more than one piece of software, a plurality of time measuring cells can be used, each dedicated to one specific piece of software.

Figure 2:
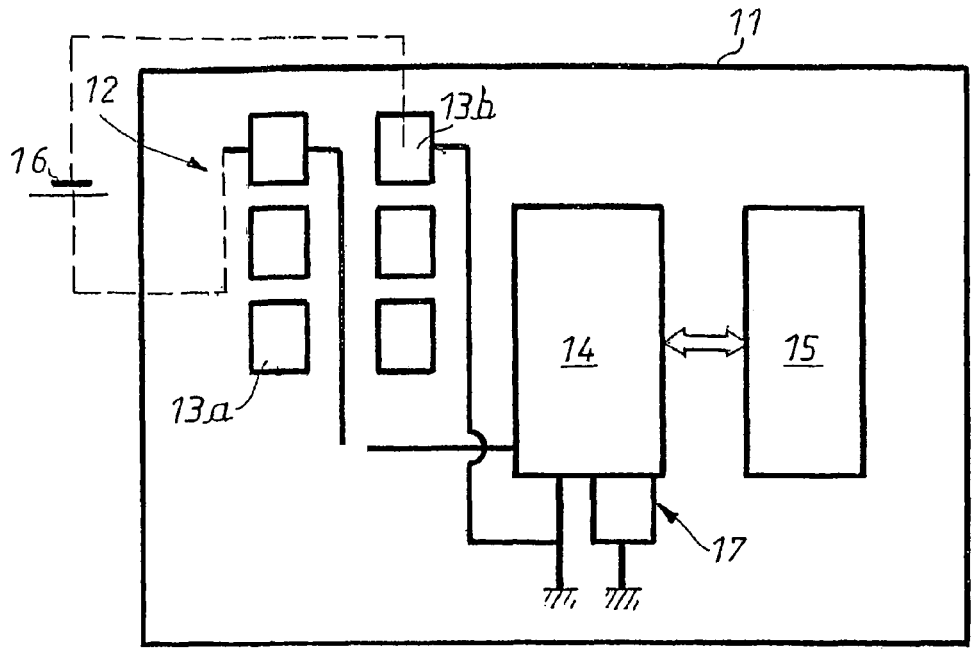
FIG. 2 is a block diagram of a microcircuit card to which one particular embodiment of the invention may be applied.

FIG. 2 shows a particular embodiment of a secure electronic entity 11 according to the present invention in which the secure electronic entity 11 is a microcircuit card and includes a unit 12 enabling it to be coupled to an external electrical power supply 16.

In the particular embodiment shown, the secure electronic entity 11 includes metal connecting areas that may be connected to a card reader. Two of these connecting areas 13a, 13b are reserved for the supply of electrical power to the microcircuit, the electrical power supply unit being accommodated in a server or other device to which the secure electronic entity is temporarily connected. These connecting areas may be replaced by an antenna accommodated within the thickness of the card and able to supply the microcircuit with the necessary electrical power at the same time as providing for the bidirectional transmission of radio-frequency signals for exchanging information. This is known as a contactless technology.

The microcircuit comprises a microprocessor 14 associated in the conventional way with a memory 15.

In one particular embodiment, the secure electronic entity 11 includes or is associated with at least one subsystem 17 for measuring time.

Figure 3:
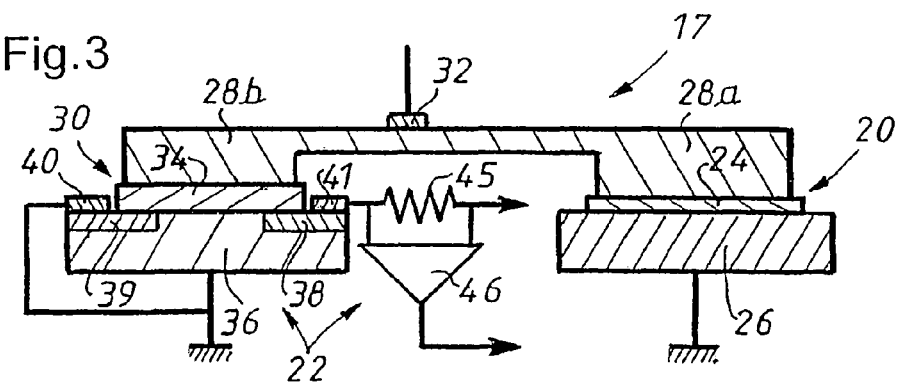
FIG. 3 is a diagram of a subsystem that one particular embodiment of the secure electronic entity may include.

The subsystem 17, which is shown in more detail in FIG. 3, is therefore housed in the secure electronic entity 11. It may form part of the microcircuit and be implemented in the same integration technology as the microcircuit.

The subsystem 17 comprises a capacitive component 20 having a leak across its dielectric space 24 and a unit 22 for measuring the residual charge in the component 20.

That residual charge is at least in part representative of the time that has elapsed since the capacitive component 20 was uncoupled from the electrical power supply.

The capacitive component 20 is charged by the external electrical power supply either via a direct connection, as in the example described here, or by any other means that can charge the gate. The tunnel effect is one method of charging the gate with no direct connection. In the example, the microprocessor 14 controls charging of the capacitive component 20.

In this example, the capacitive component 20 is a capacitor implemented in the MOS technology. The dielectric space 24 of this capacitor is a layer of silicon oxide deposited on the surface of a substrate 26 constituting one plate of the capacitor. Here the substrate 26 is grounded, i.e. connected to one power supply terminal of the external electrical power supply when the latter is connected to the card. The other plate of the capacitor is a conductive deposit 28a applied to the other face of the silicon oxide layer.

The measuring unit 22 previously mentioned substantially comprises a field-effect transistor 30, here implemented in the MOS technology, like the capacitor. The gate of the transistor 30 is connected to one terminal of the capacitive component 20. In this example, the gate is a conductive deposit 28b of the same kind as the conductive deposit 28a which constitutes one of the plates of the capacitive component 20, as indicated above.

The two conductive deposits 28a and 28b are connected to each other or constitute a single conductive deposit. A connection 32 connected to the microprocessor 14 makes it possible to apply a voltage to the two deposits 28a and 28b during a short time interval necessary for charging the capacitive component 20. The microprocessor 14 controls the application of this voltage.

More generally, the connection 32 is used to charge the capacitive component 20 at a chosen time, under the control of the microprocessor 14, and it is from the time at which that charging connection is broken by the microprocessor 14 (or at which the secure electronic entity 11 as a whole is decoupled from any electrical power supply) that the discharging of the capacitive component 20 across its dielectric space 24 begins, this loss of electrical charge being representative of the time elapsed. The time measurement implies momentary conduction of the transistor 30, which presupposes the presence of an electrical power supply between the drain and the source.

The MOS field-effect transistor 30 includes, in addition to the gate, a gate dielectric space 34 separating the gate from a substrate 36 in which are defined a drain region 38 and a source region 39. The gate dielectric space 34 consists of an insulative layer of silicon oxide. The source connection 40 applied to the source region 39 is connected to ground and to the substrate 36. The drain connection 41 is connected to a circuit for measuring the drain current that includes a resistor 45 to the terminals of which the two inputs of a differential amplifier 46 are connected. The output voltage of this amplifier is therefore proportional to the drain current.

The gate 28b is floating when the elapsed time is measured. In other words, no voltage is applied to the gate during this measurement. On the other hand, since the gate is connected to one plate of the capacitive component 20, the gate voltage during this measurement is equal to a voltage that develops between the terminals of the capacitive component 20 and which results from an initial charging thereof carried out under the control of the microprocessor 14.

The insulative layer of the transistor 30 is much thicker than that of the capacitive component 20. To give a non-limiting example, the thickness of the insulative layer of the transistor 30 may be around three times the thickness of the insulative layer of the capacitive component 20. Depending on the intended application, the thickness of the insulative layer of the capacitive component 20 is from about 4 nanometers to about 10 nanometers.

When the capacitive component 20 has been charged by the external electrical power supply, and after the charging connection has been broken at the command of the microprocessor 14, the voltage across the capacitive component 20 decreases slowly as the latter is progressively discharged across its own dielectric space 24. The discharging of the field-effect transistor 30 across the dielectric space 34 is negligible given its thickness.

To give a non-limiting example, if, for a given dielectric space thickness, the gate and the plate of the capacitive component 20 are charged to 6 volts at a time t=0, the time associated with a loss of charge of 1 volt, i.e. a reduction of the voltage to a value of 5 volts, is of the order of 24 seconds for a thickness of 8 nanometers.

The following table applies to different thicknesses:

| Duration | 1 hour | 1 day | 1 week | 1 month |
| --- | --- | --- | --- | --- |
| Oxide thickness | 8.17 nm | 8.79 nm | 9.17 nm | 9.43 nm |
| Time accuracy | 1.85% | 2.09% | 2.24% | 3.10% |

The accuracy depends on the error in reading the drain current (approximately 0.1%). Accordingly, to be able to measure a time of the order of one week, a dielectric space layer with a thickness of the order of 9 nanometers may be provided.

FIG. 3 shows a particular architecture that uses a direct connection to the floating gate (28a, 28b) to apply an electrical potential thereto and thus to cause charges to transit therein. As mentioned above, indirect charging may also be effected by substituting a control gate for the direct connection, in accordance with the technology used for fabricating EPROM and EEPROM cells.

Figure 4:
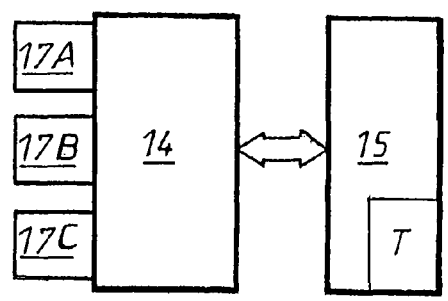
FIG. 4 is a block diagram of a variant of the embodiment shown in FIGS. 1 and 2.

The FIG. 4 variant provides three subsystems 17A, 17B, 17C each associated with the microprocessor 14. The subsystems 17A and 17B comprise capacitive components with relatively low leakage to enable the measurement of relatively long times.

However, these capacitive components are generally sensitive to temperature variations. The third subsystem 17C includes a capacitive component having a very thin dielectric space, less than 5 nanometers thick. It is therefore insensitive to temperature variations. The two capacitive components of the subsystems 17A, 17B have different leakages across their respective dielectric spaces.

Furthermore, the secure electronic entity includes a module for processing measurements of respective residual charges in the capacitive components of the first two subsystems 17A, 17B. This processing module is adapted to extract from these measurements information representative of time and substantially independent of the heat input to the secure electronic entity during the elapsed time.

In the present example, this processing module is combined with the microprocessor 14 and the memory 15. In particular, a space in the memory 15 is reserved for storing a double entry table T of time values and this table is addressed using the two respective measurements from the subsystems 17A and 17B. In other words, a portion of the memory includes a set of time values and each value corresponds to a pair of measurements resulting from reading the drain current of each of the two temperature-sensitive transistors of the subsystems 17A, 17B.

Accordingly, at the beginning of measuring the elapsed time, the two capacitive components are charged to a predetermined voltage value by the external electrical power supply via the microprocessor 14. When the microcircuit card is decoupled from the server or card reader or other entity, the two capacitive components remain charged but begin to discharge across their respective dielectric spaces and, as time passes without the microcircuit card being used, the residual charge in each of the capacitive components decreases, but differently from one to the other, because of their different design leakages.

When the card is again coupled to an external electrical power supply, the residual charges of the two capacitive components are representative of the same time interval to be determined, but are different because of any temperature variations that may have occurred throughout this time period.

The microcircuit looks up the corresponding time value for each pair of drain current values in the table T in memory previously mentioned.

It is not necessary to store the table T. For example, the processing module (i.e. essentially the microprocessor 14) may contain software for calculating a predetermined function making it possible to determine said information as a function of the two measurements substantially independently of heat input.

As described above, the third subsystem 17C includes an extremely thin dielectric space making it insensitive to temperature variations.

Other variants are feasible. In particular, if it is required to simplify the subsystem 17, eliminating the capacitive component 20 as such may be envisaged, as the field-effect transistor 30 can itself be considered as a capacitive component with the gate 28b and the substrate 36 as its plates, separated by the dielectric space 34. In this case, the capacitive component and the measuring unit may be considered to have been combined into one.

There are various ways to measure the time or a time that has elapsed since a reference date, for example the synchronization date.

A first option is to charge the cell that measures time once, when the electronic entity is first put into service. At all times, the state of charge of the time measuring cell is representative of the time elapsed since that first entry into service.

A second option is to recharge the cell each time that the secure electronic entity is powered up. This measures shorter time periods that are accumulated: on each power up of the secure electronic entity, the time elapsed since the last power up is measured, after which the capacitive component is recharged. The times measured in this way are accumulated in a memory location of the non-volatile memory of the electronic entity.

This memory location therefore stores the time elapsed since the first power up, and the elapsed time can therefore be determined at any time.

The time that elapses between measuring the charge in the capacitive component and recharging it is sometimes non-negligible. To take account of this time, a second component may be used whose function is to take over from the first during this time.

It is also feasible to use one cell for each requirement for validation or certification. In this case, each cell is preferably recharged at the time of synchronization.

Capacitive components of different accuracy may equally be used to improve the accuracy of the measurement: of several measurements, that obtained from the most accurate component that has not been discharged is selected.

Other variants are feasible that will be evident to the person skilled in the art.

Thus, according to the invention, using the time counter in the card improves security since counting down the time is difficult to falsify.

The secure electronic entity according to the present invention can cooperate with one or more other secure entities which, as a function of the result of the certification, grant rights to a user or withhold such rights, for example.

The invention claimed is:

1. A secure electronic entity, adapted to be connected to a host station, said secure electronic entity containing means for measuring time and comprising certification means for certifying a date of receipt of a command from said host station and synchronization means adapted, upon receipt of a message from said host station, to store a value in a register,
    wherein said value representative of a reference time is provided by a server,
    wherein the time measuring means carry a charge representative of an elapsed time so as to be adapted to supply a measurement of time when said electronic entity is not supplied with electrical power,
    wherein means are provided for determining a current time as a function of the charge and the value representative of the reference time stored in the register of the electronic entity, and
    wherein said certification means receives from said time measuring means information on elapsed time and produces data certifying said date, relative to said current time, intended for an external entity in reference to said information on elapsed time and to said value representative of the reference time.

2. The secure electronic entity according to claim 1, wherein said certification means are adapted to supply a certified date.

3. The secure electronic entity according to claim 1, wherein said certification means are adapted to certify the authenticity of a date received from outside.

4. The secure electronic entity according to claim 1, wherein said certification means are adapted to certify that said command has been received from said host station in a given time period or before a limit date.

5. The secure electronic entity according to claim 1, wherein said certification means use authentication means, said authentication means authenticate said data certifying said date.

6. The secure electronic entity according to claim 1, wherein the time measuring means are adapted to supply a time measurement independently of any external clock signal.

7. The secure electronic entity according to claim 1, wherein the time measuring means include means for comparing two dates.

8. The secure electronic entity according to claim 1, wherein the secure electronic entity includes at least one subsystem comprising a capacitive component having a leak across its dielectric space, means for coupling said capacitive component to an electrical power supply for it to be charged by said electrical power supply, and means for measuring the residual charge in the capacitive component, said residual charge being at least in part representative of the time that has elapsed since the capacitive component was decoupled from the electrical power supply.

9. The secure electronic entity according to claim 8, wherein said means for measuring the residual charge are part of said time measuring means.

10. The secure electronic entity according to claim 8, wherein the capacitive component is a capacitor implemented in the MOS technology and whose dielectric space consists of silicon oxide.

11. The secure electronic entity according to claim 8, wherein the means for measuring the residual charge comprise a field-effect transistor having an insulative layer, in that the capacitive component includes an insulative layer, and in that the thickness of the insulative layer of the field-effect transistor is much greater than the thickness of the insulative layer of the capacitive component.

12. The secure electronic entity according to claim 11, wherein the thickness of the insulative layer of the capacitive component is from 4 nanometers to 10 nanometers.

13. The secure electronic entity according to claim 10, wherein the secure electronic entity includes at least two subsystems each comprising a capacitive component having a leak across its dielectric space, means for coupling said capacitive component to an electrical power supply for it to be charged by said electrical power supply, and means for measuring the residual charge in the capacitive component, said residual charge being at least in part representative of the time that has elapsed since the capacitive component was decoupled from the electrical power supply, said subsystems comprising capacitive components having different leaks across their respective dielectric spaces, and in that said secure electronic entity further includes means for processing measurements of the respective residual charges in said capacitive components to extract from said measurements information substantially independent of heat input to said entity during the elapsed time.

14. The secure electronic entity according to claim 13, wherein said processing means include software for calculating a predetermined function for determining said information as a function of said measurements substantially independently of the heat input.

15. The secure electronic entity according to claim 1, wherein the secure electronic entity is portable.

16. The secure electronic entity according to claim 1, wherein the secure electronic entity is a microcircuit card.

17. The secure electronic entity according to claim 1, wherein the secure electronic entity is an electronic tag.

18. The secure electronic entity according to claim 1, wherein said information on elapsed time determines a duration.

19. A secure electronic entity comprising:
- a time measuring cell carrying a charge representative of an elapsed time;
- means for determining a current time as a function of the charge and a reference time stored in a memory of the electronic entity; and
- certification means producing data certifying an item of data relative to said current time,
- wherein said secure electronic entity is adapted to receive the reference time from a server.

20. A secure electronic entity according to claim 19, wherein said time measuring cell is adapted to carry said charge when the electronic entity is not supplied with electrical power.

21. A secure electronic entity according to claim 19, adapted to receive an authentication code for said reference time.

22. A secure electronic entity according to claim 19, adapted to decrypt the reference time.

* * * * *